(12) United States Patent
Lard

(10) Patent No.: US 10,040,227 B2
(45) Date of Patent: Aug. 7, 2018

(54) METHOD FOR MANUFACTURING A VEHICLE INTERIOR TRIM PART INTENDED FOR COVERING AN AIRBAG

(71) Applicant: Faurecia Interieur Industrie, Nanterre (FR)

(72) Inventor: Frédéric Lard, Saint Martin le Noeud (FR)

(73) Assignee: Faurecia Interieur Industrie, Nanterre (FR)

( * ) Notice: Subject to any disclaimer, the term of this patent is extended or adjusted under 35 U.S.C. 154(b) by 155 days.

(21) Appl. No.: 15/086,240

(22) Filed: Mar. 31, 2016

(65) Prior Publication Data

US 2016/0288381 A1  Oct. 6, 2016

(30) Foreign Application Priority Data

Mar. 31, 2015  (FR) ...................................... 15 52742

(51) Int. Cl.
 *B29C 44/12*  (2006.01)
 *B60R 21/215*  (2011.01)
 (Continued)

(52) U.S. Cl.
 CPC ...... *B29C 44/1257* (2013.01); *B29C 65/4815* (2013.01); *B60R 21/205* (2013.01);
 (Continued)

(58) Field of Classification Search
 CPC . B60R 21/205; B60R 21/215; B60R 21/2165; B60R 21/217; B60R 21/04; B60R 2021/161; B29C 65/4815; B29C 44/1257; B29C 44/351; B29K 2623/12; B29K 2105/0097; B29K 2075/00; B29L 2031/3038
 (Continued)

(56) References Cited

U.S. PATENT DOCUMENTS 5,590,901 A  1/1997  MacGregor
6,070,901 A *  6/2000  Hazell .................. B60R 21/205
                                                     280/728.3
(Continued)

FOREIGN PATENT DOCUMENTS

DE  102010049077 A1  4/2012
EP     0715992 A1  6/1996
(Continued)

OTHER PUBLICATIONS

French Search Report and Written Opinion, in French, corresponding to application No. FR1552742, dated Mar. 31, 2015, 6 pages.

*Primary Examiner* — Toan To
(74) *Attorney, Agent, or Firm* — Reising Ethington P.C.

(57) ABSTRACT

A method for manufacturing a vehicle interior trim part intended for covering an airbag. The method includes the steps of: a) providing a support having an opening; b) providing a chute channel defining a passage to guide deployment of the airbag and integral with a cover member; c) fastening the chute channel to the support by a continuous peripheral bead of adhesive extending along the periphery of the opening; d) bringing a mold element to face the support and chute channel so as to define a closed cavity; and e) injecting foam into the cavity.

15 Claims, 2 Drawing Sheets

(51) Int. Cl.
  *B60R 21/217* (2011.01)
  *B29C 65/48* (2006.01)
  *B60R 21/205* (2011.01)
  *B60R 21/2165* (2011.01)
  *B29K 75/00* (2006.01)
  *B29K 105/00* (2006.01)
  *B29K 105/04* (2006.01)
  *B29L 31/30* (2006.01)
  *B60R 21/04* (2006.01)
  *B60R 21/045* (2006.01)
  *B60R 21/16* (2006.01)
  *B29C 44/34* (2006.01)

(52) U.S. Cl.
  CPC .......... *B60R 21/215* (2013.01); *B60R 21/217* (2013.01); *B60R 21/2165* (2013.01); *B29C 44/351* (2013.01); *B29K 2075/00* (2013.01); *B29K 2105/0097* (2013.01); *B29K 2105/04* (2013.01); *B29K 2623/12* (2013.01); *B29L 2031/3038* (2013.01); *B60R 21/04* (2013.01); *B60R 21/045* (2013.01); *B60R 2021/161* (2013.01); *B60R 2021/2172* (2013.01)

(58) Field of Classification Search
  USPC ............................ 280/728.2, 728.3, 732, 731
  See application file for complete search history.

(56) References Cited

U.S. PATENT DOCUMENTS

| | | | |
|---|---|---|---|
| 7,611,163 B2 | 11/2009 | Schweizer et al. | |
| 8,336,906 B2* | 12/2012 | Kim | B29C 44/1238 280/728.2 |
| 8,870,219 B1* | 10/2014 | Roy | B60R 21/205 280/728.2 |
| 9,039,036 B1* | 5/2015 | Roy | B60R 21/215 280/728.3 |
| 9,533,649 B2* | 1/2017 | Luckett | B60R 21/215 |
| 2005/0087963 A1* | 4/2005 | Dailey | B60R 21/205 280/728.3 |
| 2006/0214399 A1* | 9/2006 | Okamoto | B29C 44/1228 280/728.3 |
| 2010/0230938 A1* | 9/2010 | Mazzocchi | B60R 21/205 280/732 |
| 2010/0230939 A1* | 9/2010 | Mazzocchi | B29C 44/12 280/732 |
| 2013/0001929 A1 | 1/2013 | Mazzocchi | |

FOREIGN PATENT DOCUMENTS

| | | |
|---|---|---|
| EP | 2193052 A1 | 6/2010 |
| EP | 2347938 A1 | 7/2011 |

* cited by examiner

METHOD FOR MANUFACTURING A VEHICLE INTERIOR TRIM PART INTENDED FOR COVERING AN AIRBAG

TECHNICAL FIELD

The present invention relates to a method for manufacturing a vehicle interior trim part intended for covering an airbag, as well as an interior trim part obtained by such a manufacturing method.

BACKGROUND

More specifically, the invention relates to a method for manufacturing a vehicle interior trim part intended for covering an airbag, comprising the steps of:

a) providing a support having an opening;

b) providing a chute channel defining a passage to guide deployment of the airbag and a cover member adapted to cover the passage and fastened to said chute channel thereon;

c) fastening the chute channel to the support;

d) bringing a mold element to face the support and chute channel so as to define a closed cavity; and e) injecting foam into the cavity.

Conventionally, in such manufacturing methods, the chute channel is fastened to the support by elastically interlocking or clipping into place, with a foam seal secured to the chute channel resting on the support all around the periphery of the opening.

However, such a technique is not entirely satisfactory, particularly in terms of reliability and repeatability of the seal so formed between the chute channel and the support, as well as in terms of reliability of operation of a trim part obtained by such a method.

Another known technique is to fasten the chute channel to the support by welding, especially by vibration welding or ultrasonic welding, the chute channel and the support being made of plastic.

Although this results in a reliable seal between the chute channel and the support, such a technique has the drawback of being particularly expensive to implement, as the vibration or ultrasonic welding machines represent a significant investment and occupy significant space at the manufacturing site.

In addition, fastening by ultrasonic or vibration welding of the chute channel to the support imposes certain design constraints on one and/or the other of these elements, in particular due to the need to provide welding ribs on these elements that are intended to melt under the effect of the ultrasound or vibration and form the seal between the chute channel and the support at the end of this step of fastening the two elements. The presence of such welding ribs increases the complexity of the mold design used to produce, for example by injection molding, the chute channel and/or the support and thereby adds a significant additional cost to the manufacturing process.

SUMMARY

The present invention aims to overcome these disadvantages and therefore proposes a method of the aforementioned type, wherein, during step c), the chute channel is fastened to the support by a continuous peripheral bead of adhesive extending along the periphery of the opening.

With these arrangements, the invention in at least some embodiments provides a method for manufacturing a vehicle interior trim part wherein the sealing of the foam interface between the support and the chute channel is achieved in a reliable and repeatable manner while reducing manufacturing costs, and a trim part obtained by such a method having an aesthetic appearance and a reliable operation that are improved compared to known devices.

Indeed, in conventional methods relying on an elastic interlocking of the chute channel on the support, with a foam seal secured to the chute channel resting on the support to create the seal between these two elements, the injected foam, which has high flowability, is likely to break through the foam seal and during the injection step to creep between the chute channel and the support. Such a phenomenon can spoil the aesthetic appearance of the trim part obtained, as a bulge may appear on the finished trim part in localized areas where the foam has penetrated between the support and the chute channel.

Such non-uniformities in the connection between the support and the chute channel may also interfere with successful deployment of the airbag covered by the trim part when said part is installed in a vehicle, especially in terms of uniformity and repeatability of deployment.

In addition, the use of an adhesive technique to achieve the sealed fastening of the chute channel to the support allows reducing the manufacturing costs of such a trim part in comparison to the use of a vibration or ultrasound welding technique as exists in the prior art.

According to one advantageous embodiment of the method according to the invention, the method comprises, between step b) and step c), a step of applying onto the chute channel the adhesive intended for forming the bead of adhesive.

As the chute channel is generally of smaller dimensions than the support to which it is to be fastened, such as a dashboard body, a door panel, or other, applying the adhesive to the chute channel prior to fastening the chute channel to the support allows the use of a gluing machine that is smaller than if this adhesive was applied to the support.

In one embodiment of the method according to the invention, the adhesive intended for forming the bead of adhesive is applied to a peripheral flange of the chute channel extending substantially perpendicularly to a channel wall, of the chute channel, that is substantially tubular and defines the passage.

In an advantageous arrangement, during step b) the chute channel is provided with a cover member that is integral with the chute channel. "Integral" is understood here to mean that the cover member and the chute channel are formed as one piece.

Alternatively, it may be provided that the cover member is an element separate from the chute channel and fastened thereon by any appropriate means so that it covers the passage defined by the chute channel.

Advantageously, the adhesive used to form the bead of adhesive comprises a polyolefin adhesive, preferably hot melt.

Alternatively, it may be arranged that the adhesive used to form the bead of adhesive wholly consists of a polyolefin adhesive, preferably hot melt.

Such a polyolefin hot melt adhesive has the advantage of a very short cooling time of about 15 seconds, thereby quickly achieving the sealed fastening of the chute channel to the support prior to placement of the mold and injection of the foam. In addition, such a polyolefin hot melt adhesive has a curing time that is virtually zero, allowing manipulation of the part to which the adhesive is applied as soon as the application operation is complete. The use of this adhesive is therefore especially suitable for industrial constraints, particularly those of the automotive industry in which increasing the production rates is always an interest.

According to another advantageous arrangement, the support provided in step a) and/or the chute channel provided in step b) comprises polypropylene.

Advantageously, the support provided in step a) and/or the chute channel provided in step b) comprises polypropylene that is loaded/reinforced, for example with fibers such as glass fibers.

Alternatively, the support provided in step a) and/or the chute channel provided in step b) is wholly made of polypropylene.

In yet other variants, the support provided in step a) and/or the chute channel provided in step b) may comprise or be wholly made of another material, particularly another plastic, preferably containing polyolefin, possibly loaded/reinforced for example with fibers such as glass fibers.

Creating the support and chute channel of polypropylene or of a material comprising polypropylene or of some other polyolefinic material is particularly advantageous in a context where a polyolefin adhesive is used to create the bead of adhesive ensuring the sealed fastening of these two elements. In fact, as polyolefin adhesive has the same chemical base as polypropylenes or other polyolefinic material, the sealed fastening achieved by gluing the support and the chute channel can be reliably carried out with no specific surface treatment of the elements to be assembled.

As a variant, the adhesive used to create the bead of adhesive comprises a curable polyolefin adhesive.

According to another variant, the adhesive used to create the bead of adhesive comprises a polyurethane adhesive that may or may not be curable.

According to still other variants, the adhesive used to create the bead of adhesive is wholly made of a curable polyolefin adhesive or of a polyurethane adhesive that may or may not be curable.

The choice of composition of the adhesive used to create the bead of adhesive is made in particular based on the materials from which the elements to be assembled are made, namely the support and the chute channel, and the compatibility of these materials with the various adhesives discussed above for example. Adhesive compositions other than those mentioned above may also be considered.

The invention in at least some embodiments also provides a vehicle interior trim part intended to cover an airbag, comprising:
  a support having an opening;
  a chute channel defining a passage to guide deployment of the airbag and secured to a cover member adapted to cover the passage, said chute channel being fastened to the support;
  a foam layer extending over the support and chute channel at the opening;
  wherein the chute channel is fastened to the support by a continuous peripheral bead of adhesive which extends along the periphery of the opening.

In one advantageous embodiment of the interior trim part according to the invention:
  the chute channel comprises a substantially tubular channel wall defining the passage, and a peripheral flange extending substantially perpendicularly to the channel wall; and
  the support and the peripheral flange of the chute channel together define a peripheral recess in which the bead of adhesive lies.

According to one particular arrangement of this embodiment, the support and the peripheral flange of the chute channel further define a radial channel having a first end opening into the peripheral recess. The implementation of one or more radial channels communicating with the peripheral recess serves to carry away from the peripheral recess any excess adhesive intended for forming the bead of adhesive.

Advantageously, the bead of adhesive comprises a polyolefin adhesive, preferably hot melt.

Alternatively, the bead of adhesive is wholly made of a polyolefin adhesive, preferably hot melt.

Preferably the support and/or the chute channel comprises polypropylene.

Advantageously, the support and/or the chute channel comprises polypropylene that is loaded/reinforced, for example with fibers such as glass fibers.

Alternatively, the support and/or the chute channel is wholly made of polypropylene.

The advantages arising from the use of these materials for the bead of adhesive, the support, and the chute channel was discussed above in relation to the manufacturing method according to the invention.

In other variants, the bead of adhesive comprises a curable polyolefin adhesive and/or a polyurethane adhesive that may or may not be curable.

According to yet other variants, the bead of adhesive is wholly made of a curable polyolefin adhesive or of a polyurethane adhesive that may or may not be curable.

According to yet other embodiments, the support and/or the chute channel may comprise or be wholly made of another material, in particular another plastic, preferably polyolefin, possibly loaded/reinforced for example with fibers such as glass fibers.

In one particular embodiment, the trim part according to the invention is a dashboard and the support is a dashboard body.

BRIEF DESCRIPTION OF THE DRAWINGS

Other features and advantages of the invention will be apparent from the following description of one of its embodiments, given by way of non-limiting example with reference to the accompanying drawings.

In the drawings.

DETAILED DESCRIPTION

In the various figures, the same references designate identical or similar elements.

Figure 1:
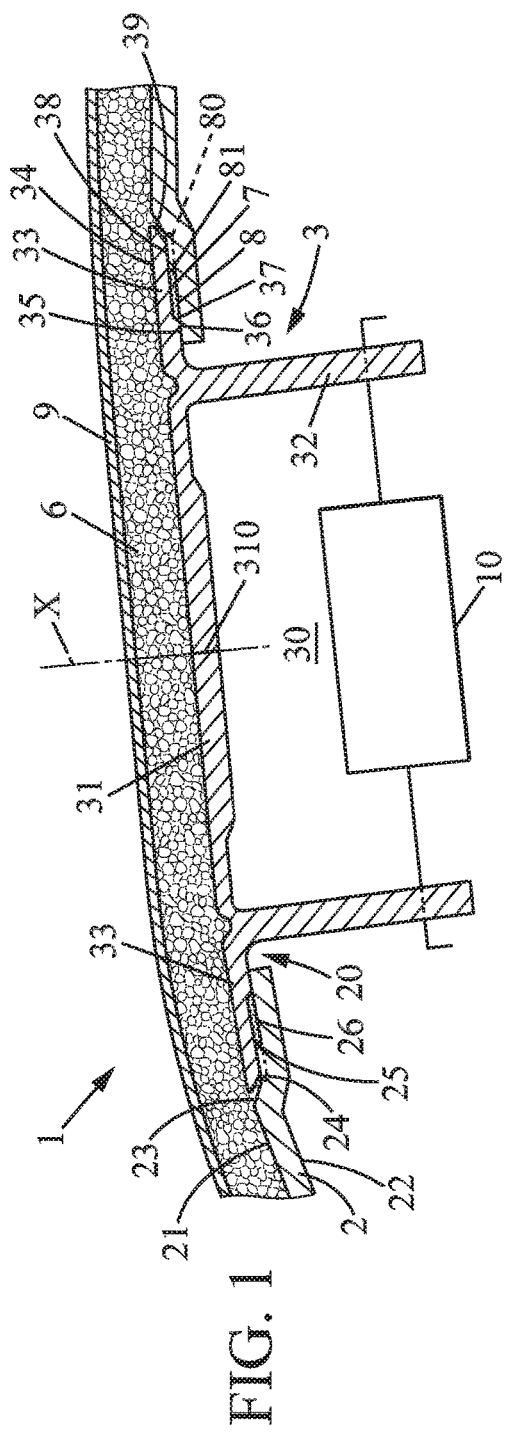
FIG. 1 is a schematic sectional view of a dashboard of a motor vehicle, equipped with an airbag and in which the method according to the invention is implemented, the sectional view being along line I-I of FIG. 2 which shows the support only.

In FIG. 1, a dashboard 1 of motor vehicle equipped with an airbag module 10 is schematically represented in a sectional view. The dashboard 1 forms an interior trim part of the vehicle, intended to cover the airbag module 10.

In a known manner, the dashboard illustrated in FIG. 1 comprises a dashboard body 2 forming a structural support for the various accessories and devices arranged on the dashboard 1.

Figure 2:
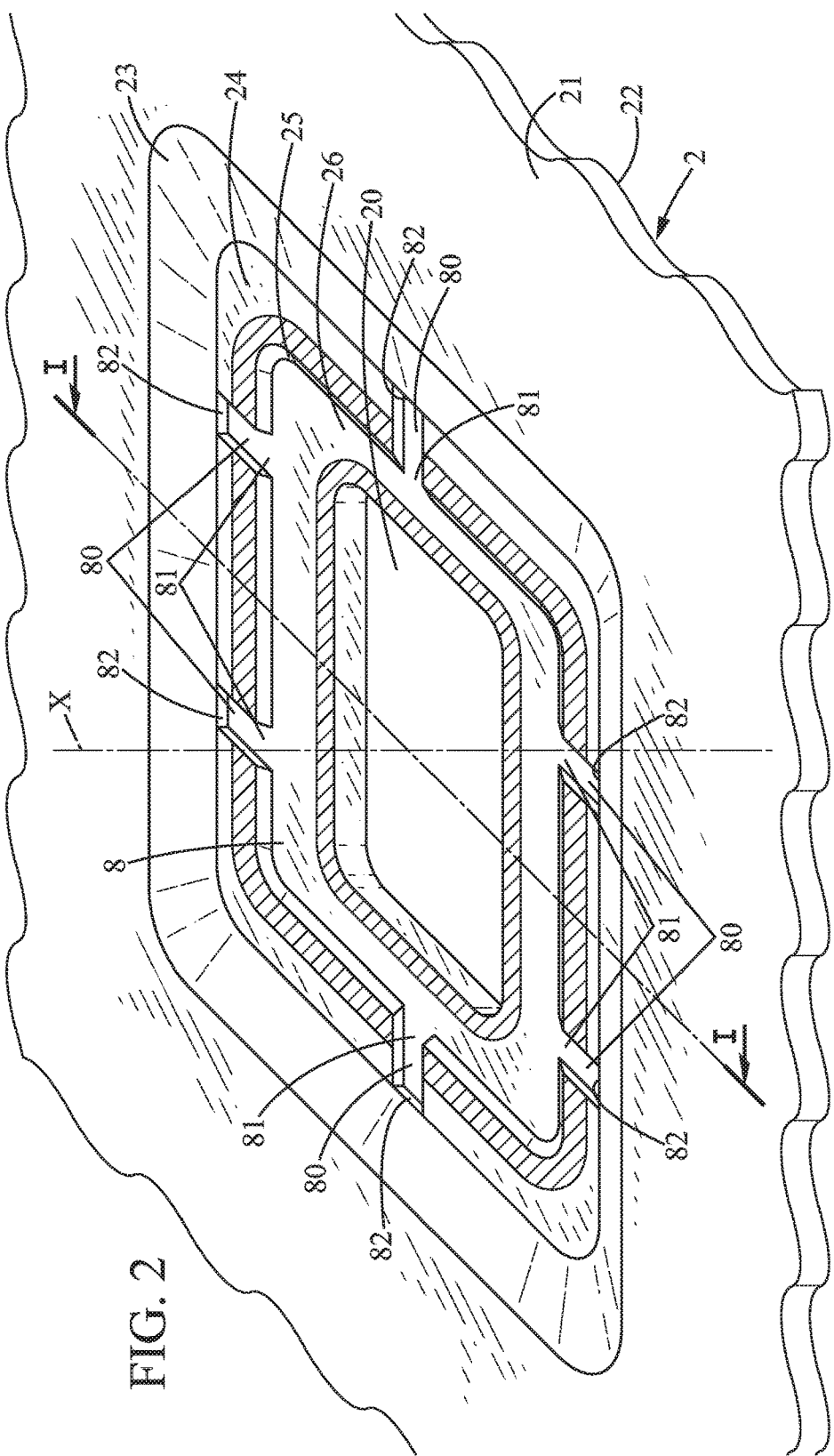
FIG. 2 is a schematic perspective view of the support, represented alone for clarity.

As can be seen in FIGS. 1 and 2, the dashboard body 2 serving as a support has an opening 20 that is substantially rectangular in shape with rounded corners. Alternatively, the opening may be circular, trapezoidal, oval, or some other shape without departing from the scope of the invention.

The dashboard 1 illustrated in FIG. 1 further comprises a chute channel 3 defining a passage 30 to guide deployment of the airbag and a cover member 31 fastened to said chute channel thereon and adapted to cover the passage 30.

In the embodiment illustrated in the figures, the chute channel 3 comprises a substantially tubular channel wall 32 having a cross-section of a shape substantially complementary to that of the opening 20 of the support 2 and defining the passage 30 to guide the airbag, the airbag module 10 being fastened to the channel wall 32 in the passage 30, by any appropriate means known to a person skilled in the art.

As can be seen in FIG. 1, the cover member 31 is integral with the chute channel 3 and has two symmetrical parts separated by a break line 310 intended to break apart under the effect of the airbag deployment, the two parts of the cover member then pivoting relative to the channel wall 32 to allow the airbag 30 to travel through the passage and into the passenger compartment when the vehicle is involved in a collision.

In the illustrated embodiment, the break line 310 defines a H-shaped opening for the passage of the air bag; however, without departing from the scope of the invention, it may be arranged that the cover member 31 is made of a portion connected on the one hand by a hinge and on the other by a break line at the channel wall 32, defining a U-shaped opening for the passage of the airbag.

Similarly, it may be arranged that the cover member 31 is provided as an element separate from the chute channel 3 and fastened for example to the channel wall 32 by any suitable means known to persons skilled in the art.

The chute channel 3 further comprises a peripheral flange 33 extending substantially perpendicularly to the channel wall 32.

As can be seen in FIG. 1, the chute channel 3 is fastened to the dashboard body 2 by centering, relative to the opening 20, the passage 30 defined by the channel wall 32, and creating a seal between the chute channel and the dashboard body 2.

Specifically, the chute channel 3 is fixed to the dashboard body 2 by inserting the channel wall 32 defining the passage 30 into the opening 20 formed in the dashboard body 2, such that the X axes defined by the passage 30 and the opening 20 substantially coincide.

This insertion of the channel wall 32 into the opening 20 continues until the peripheral flange 33 of the chute channel 3 abuts against the edge of the opening 20 formed in the dashboard body 2. In the fastened state, the chute channel 3 extends into the opening 20 formed in the dashboard body 2 and covers said opening.

In the embodiment illustrated in FIGS. 1 and 2 in particular, the dashboard body 2 is in the form of a substantially planar member having an outer surface 21 intended to be facing the passenger compartment of the vehicle and an inner surface 22 on the side opposite the outer surface 21.

As can be seen in FIG. 2, the outer surface 21 of the dashboard body 2 has, in succession as one approaches the opening 20 and centered with respect to this opening 20, a first peripheral beveled portion 23, a first peripheral flat area 24, a second peripheral beveled portion 25, and a second peripheral flat area 26 extending to the edges of the opening 20. Thus, the outer surface 21 of the dashboard body 2 has two recesses delimited by the first peripheral flat area 24 and the second peripheral flat area 26.

Furthermore, as can be seen in FIG. 1, the peripheral flange 33 of the chute channel 3 has an outer surface 34 intended to be facing towards the passenger compartment of the vehicle and an inner surface 35 on the side opposite the outer surface 34. The inner surface 35 of the peripheral flange 33 has, in succession as one moves away from the channel wall 32 and centered relative to the passage 30 defined by the channel wall 32, a first peripheral flat area 36, a peripheral beveled portion 37, a second peripheral flat area 38, and a peripheral beveled end 39.

When the chute channel 3 is mounted on the dashboard body 2, as can be seen in FIG. 1, the first peripheral flat area 36 of the peripheral flange 33 of the chute channel 3 bears on the second peripheral flat area 26 of the outer surface 21 of the dashboard body 2, the second peripheral flat area 38 of the peripheral flange 33 of the chute channel 3 bears on the first peripheral flat area 24 of the outer surface 21 of the dashboard body 2, and the peripheral beveled end 39 of the flange of the chute channel 3 extends facing the first peripheral beveled portion 23 of the outer surface 21 of the dashboard body 2, with a gap remaining between this beveled end 39 and this first peripheral beveled portion 23.

In other words, the peripheral flange 33 of the chute channel 3 is received in a recess defined on the outer surface 21 of the dashboard body 2, the outer surface 34 of the flange 33 and the outer surface of the cover member 31 being substantially flush with the outer surface of the dashboard body 2 when the chute channel 3 is mounted on the dashboard body 2.

The areas for supporting the peripheral flange 33 of the chute channel on the outer surface 21 of the dashboard body are represented as hatched areas in FIG. 2 where only the dashboard body 2 around the opening 20 is partially represented.

As can be seen in FIGS. 1 and 2, the dashboard body 2 and the peripheral flange 33 of the chute channel 3 together define a peripheral recess 8. This peripheral recess 8 is defined between the second flat area 26 of the outer surface 21 of the dashboard body 2 and the second flat area 38 of the inner surface 35 of the flange 33 of the chute channel 3.

The sealed fastening of the chute channel 3 to the dashboard body 2 is achieved by a continuous peripheral bead of adhesive 7 running inside the peripheral recess 8 defined when the chute channel 3 is in place on the dashboard body 2. This continuous peripheral bead of adhesive 7 thus extends along the entire periphery of (all around) the opening 20.

Advantageously, the bead of adhesive 7 securing the chute channel 3 to the dashboard body 2 is made of a hot melt polyolefin adhesive.

In one particularly advantageous embodiment, the chute channel 3 and the dashboard body 2 are made of polypropylene, and the adhesive used to form the bead of adhesive 7 is a polyolefin hot melt adhesive that enables a reliable assembly by gluing these two polypropylene elements with no need for any particular surface treatment.

Preferably, and as can be seen in FIG. 1 and more clearly in FIG. 2, the chute channel 3 and the dashboard body 2 further delimit between them radial channels 80, six in the embodiment illustrated, that extend in a radial direction perpendicular to the peripheral direction defined by the opening 20, having a first end 81 in the radial direction opening into the peripheral recess 8 and the second end 82 in the radial direction that is blind and that is located substantially at the radially outer edge of the first flat area 24 provided on the outer surface 21 of the dashboard body 2.

As can be seen in FIG. 1, when the chute channel 3 is mounted on the dashboard body 2, at the second end 82, a radially outer portion of the radial channels 80 opens into the gap existing between the beveled peripheral end 38 of the flange of the chute channel 3 and the first peripheral beveled portion 23 of the outer surface 21 of the dashboard body 2.

Such radial channels are intended to accept, accommodate, receive any surplus adhesive escaping from the peripheral recess 8 defined between the dashboard body 2 and the chute channel 3 and exceeding the volume of adhesive necessary for forming the bead of adhesive 7 fastening and sealing these elements.

In the embodiment illustrated in the figures, if the surplus adhesive represents a volume of more than the sum of the geometric volumes of the radial channels 80, the excess adhesive will escape through the radially outer portions of the radial channels 80 which lead to the gap existing between the peripheral beveled end 38 of the flange of the chute channel 3 and the first peripheral beveled portion 23 of the outer surface 21 of the dashboard body 2.

In addition, the dashboard 1 of FIG. 1 further presents a foam layer 6 extending above the dashboard body 2, the chute channel 3, and the cover member 31, in particular at the opening 20 and the passage 30, imparting a soft feel to the dashboard 1, and a covering skin 9 over the foam layer 6, provided to give an aesthetic appearance to the dashboard 1.

When the vehicle is involved in a collision, the airbag exits the module 10 and deploys through the passage 30 of the chute channel 3. As it does so, the airbag exerts pressure on the inner face of the cover member 31 facing the passage 30, resulting in the rupture of the break line 310 separating the two portions of the cover member 31, the foam layer 6, and the covering skin 9 over the passage 30, the two latter elements possibly being provided with lines of least resistance forming tear initiators.

The two portions of the cover member 31, along with the overlying portions of foam layer 6 and covering skin 9, then form two flaps which pivot relative to the channel wall 32 of the chute channel 3 fastened to the dashboard body 2, allowing the airbag to deploy through the passage 30 and into the passenger compartment of the vehicle.

In the method for manufacturing an interior trim part according to the invention, such as the dashboard 1 described above, a dashboard body 2 and a chute channel 3 as described above are provided.

In a subsequent step, polyolefin hot melt adhesive is applied on the inner surface 35 of the peripheral flange 33 of the chute channel 3, and more specifically on the second flat area 38 defined on this inner surface 35.

Next, the chute channel 3, provided with a certain amount of glue extending along the periphery of the inner surface 35 of the flange 33, is placed adjacent to the dashboard body 3, and the channel wall 32 is inserted (from above in the current case) into the opening 20 until the inner surface 35 of the flange 33 bears against the outer surface 21 of the dashboard body 3 at the hatched areas indicated in FIG. 2.

A slight pressure is then applied to the chute channel 3 so that the adhesive provided on the inner surface 35 of the peripheral flange 33 comes into contact with the second flat area 26 of the outer surface 21 of the dashboard body 2 and is distributed within the peripheral recess 8 so as to form the continuous peripheral bead of adhesive 7 extending along the entire periphery of the opening and thereby providing a sealed fastening of the chute channel 3 to the dashboard body 2.

Any excess adhesive that was applied to the inner surface 35 of the flange 33 is discharged into the radial channels 80 communicating via their first ends 81 with the peripheral recess 8.

In the case of substantial excess adhesive, the excess adhesive can be discharged from the radial channels 80 by seeping into the gap remaining between the beveled end 39 of the flange 33 and the first peripheral groove 23 of the outer surface 21 of the dashboard body 2, and spreads over this outer surface 21.

The adhesive is then allowed time to cool so that the continuous peripheral bead of adhesive 7 provides a sealed fastening of the chute channel 3 and the dashboard body 2 along the entire periphery of the opening.

Figure 3:
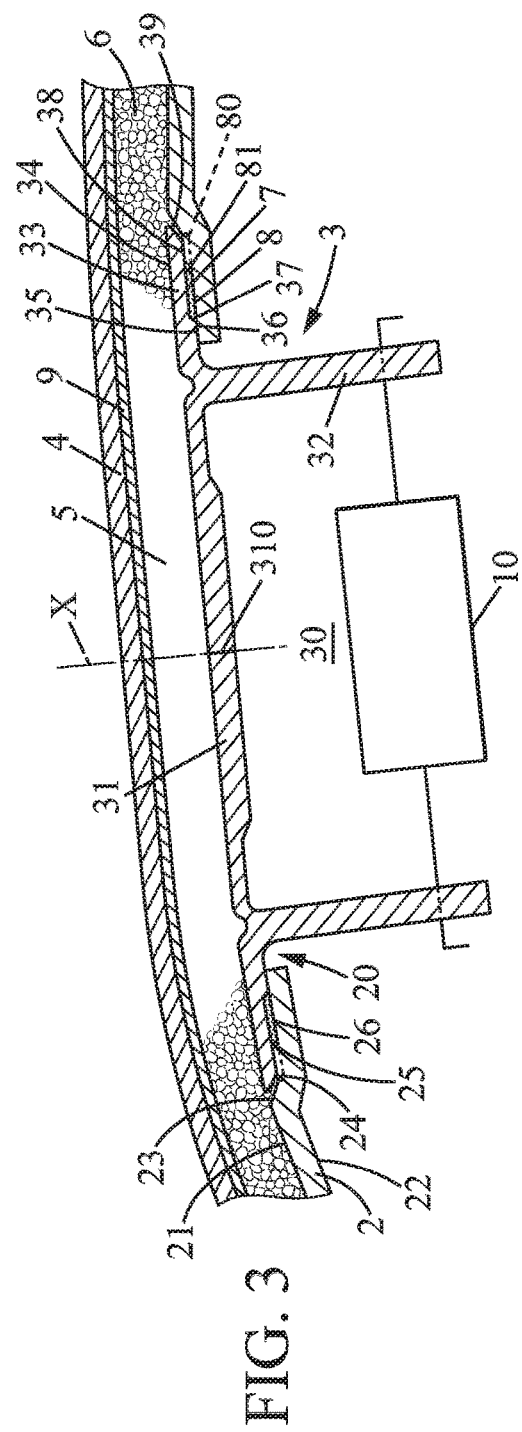
FIG. 3 is a view similar to FIG. 1, illustrating the manufacturing method according to the invention during the foam injection step.

In a subsequent step of the method, and as can be seen in particular in FIG. 3, a mold element 4, previously fitted with a covering skin 9, is brought to face the dashboard body 2 and the chute channel 3 equipped with the cover member 31, so as to define therewith an enclosed cavity 5 intended to receive the foam.

In a final step visible in FIG. 3, which illustrates the foam entering the closed cavity 5, the foam is introduced into the closed cavity 5, for example by heat injection.

As the seal between the dashboard body 2 and the chute channel 3 has been reliably obtained by the continuous peripheral bead of adhesive 7 extending along the entire periphery of the opening 20 as described above, the injected foam does not seep between the two, but spreads over the dashboard body 2, the chute channel 3, and the cover member 31, until the closed cavity 5 is filled.

As it fills the closed cavity 5, the foam 6 adheres to the covering skin 9 and provides the connection between the dashboard body 2, the chute channel 3 equipped with the cover member 31, and the covering skin 9.

Once the foam injection step is completed, time is allowed for the foam layer 6 to cool, if such is necessary, and the mold element 4 is removed.

This provides a finished dashboard 1 providing an aesthetic appearance and improved reliability.

Although the above description has been given in relation to a trim element in the form of a dashboard, this trim element could be a door panel, a center pillar or B-pillar panel, a roof panel, or any other vehicle interior trim element intended for covering an airbag.

The invention claimed is:

1. A method for manufacturing a vehicle interior trim part intended for covering an airbag, comprising the steps of:
   a) providing a support having an opening;
   b) providing a chute channel defining a passage to guide deployment of the airbag and a cover member adapted to cover the passage and fastened onto said chute channel;
   c) fastening the chute channel to the support;
   d) bringing a mold element to face the support and chute channel, so as to define a closed cavity; and
   e) injecting foam into the cavity,
   wherein during step c), the chute channel is fastened to the support by a continuous peripheral bead of adhesive extending along the periphery of the opening.

2. The method according to claim 1, comprising, between step b) and step c), a step of applying onto the chute channel the adhesive intended for forming the continuous peripheral bead of adhesive.

3. The method according to claim 2, wherein the adhesive intended for forming the continuous peripheral bead of adhesive is applied to a peripheral flange of the chute channel extending substantially perpendicularly to a channel wall, of the chute channel, that is substantially tubular and defines the passage.

4. The method according to claim 1, wherein the adhesive used to form the continuous peripheral bead of adhesive in step c) comprises a polyolefin adhesive.

5. The method according to claim 1, wherein the adhesive used to form the continuous peripheral bead of adhesive in step c) comprises a polyurethane adhesive.

6. The method according to claim 1, wherein the adhesive used to form the continuous peripheral bead of adhesive in step c) is hot melt.

7. The method according to claim 1, wherein the adhesive used to form the continuous peripheral bead of adhesive in step c) is curable.

8. The method according to claim 1, wherein the support provided in step a) and/or the chute channel provided in step b) comprises polypropylene.

9. A vehicle interior trim part intended for covering an airbag, comprising:
   a support having an opening;
   a chute channel defining a passage to guide deployment of the airbag and a cover member adapted to cover the passage and fastened to said chute channel thereon, said chute channel being fastened to the support; and
   a foam layer extending over the support and chute channel at the opening;
   wherein the chute channel is fastened to the support by a continuous peripheral bead of adhesive extending along the periphery of the opening.

10. The vehicle interior trim part according to claim 9, wherein:
   the chute channel comprises a substantially tubular channel wall defining the passage, and a peripheral flange extending substantially perpendicularly to the channel wall; and
   the support and the peripheral flange of the chute channel together define a peripheral recess in which the continuous peripheral bead of adhesive lies.

11. The vehicle interior trim part according to claim 10, wherein the support and the peripheral flange of the chute channel further define a radial channel having a first end opening into the peripheral recess.

12. The vehicle interior trim part according to claim 9, wherein the continuous peripheral bead of adhesive comprises a polyolefin adhesive.

13. The vehicle interior trim part according to claim 9, wherein the support and/or the chute channel comprises polypropylene.

14. The vehicle interior trim part according to claim 9, wherein the support and/or the chute channel is reinforced with fibers.

15. The vehicle interior trim part according to claim 9, wherein during step b) the chute channel is provided with a cover member that is integral with the chute channel.

* * * * *